United States Patent Office 2,944,040
Patented July 5, 1960

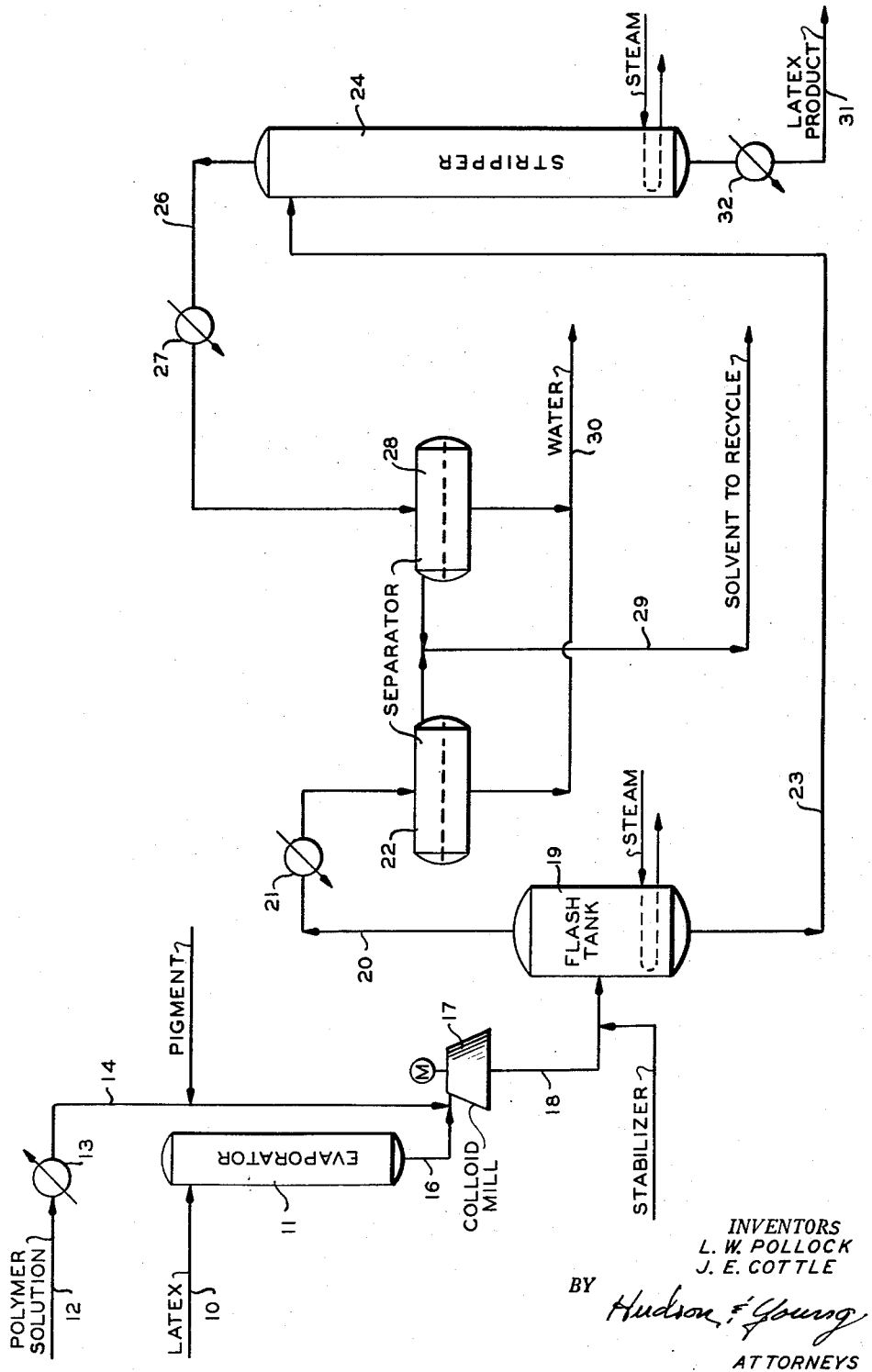

2,944,040

METHOD OF PREPARING HIGH SOLIDS LATICES OF FILM-FORMING POLYMERS AND HIGH DENSITY ETHYLENE POLYMERS

Lyle W. Pollock and John E. Cottle, Bartlesville, Okla., assignors to Phillips Petroleum Company, a corporation of Delaware Filed Sept. 17, 1956, Ser. No. 610,150

4 Claims. (Cl. 260—29.7)

This invention relates to novel blends of latex emulsions and ethylene polymers. In another aspect, this invention relates to a process for blending ethylene polymers with water emulsions of elastomeric or resinous film-forming polymers, thereby producing an improved latex suitable for use in a latex or water-thinned paint.

Stabilized polymer emulsions are recognized as having high utility as latex paints and coating materials applied by spray or dip methods. Emulsions of synthetic elastomers, such as butadiene-styrene copolymers, can be stabilized, pigmented and employed as paints which exhibit many favorable characteristics, such as resistance to acids, alkalis, petroleum, smoke and mold formation. These paints are durable, quick-drying and can be sprayed or applied with a brush or roller. Heavy protective coatings which are somewhat resilient can be applied by dipping an article in a latex bath. Resinous additives enhance the usefulness of such coatings for many applications, but the incorporation of these materials is made difficult by the tendency of the latex to coagulate prematurely.

We have discovered an improved latex blend comprising various elastomeric or resinous film-forming polymer latices and a highly crystalline ethylene polymer, which blend, when applied to surfaces as a paint or dip coating, exhibits improved resistance to moisture and salt spray. The protective film so formed has improved gloss and washability with reduced moisture-vapor permeability. We have likewise discovered a method for producing this improved latex by blending a high solids latex with a solution of ethylene polymer in such a manner that coagulation of the latex is virtually eliminated. In accordance with the process of our invention, a high solids latex and a highly crystalline ethylene polymer dissolved in solvent are blended in colloidal form at a temperature above the softening point of the ethylene polymer, and thereafter cooled quickly by flashing solvent therefrom before the latex can coagulate.

It is an object of this invention to provide an improved latex paint having better gloss and washability. It is another object of this invention to provide an improved latex reinforced with a highly crystalline ethylene polymer which is useful as a surface coating material. It is still another object of this invention to provide a method whereby such an improved latex can be made without undue coagulation of the elastomeric or resinous base material. Further objects, advantages and features will become apparent to those skilled in the art from the accompanying discussion and drawing which is a schematic flow diagram depicting one embodiment of our invention.

Latex paints which are basically water-emulsions of various film-forming elastomeric or resinous polymers have recently made a phenomenal rise to prominence in the paint and varnish industry. These paints dry quickly, are virtually odorless and being thinnable by water are convenient for the amateur to use. By the term "latex" as it is used in this specification, it is intended to include all elastomeric and rubbery polymer latices both natural and synthetic as well as those film-forming resinous polymers which when in emulsion form are suitable for use in latex paints.

In these paints, the latex is in the dispersed phase and water is the continuous phase. Generally, the latex particles are approximately 0.2 micron in diameter and upon application to the surface to be coated, gradually coalesce to form a film thereon. Particles of pigment which are also dispersed in the continuous water phase migrate to the latex phase as the film is formed. These paints contain also various emulsifiers, protective colloids, foam suppressors, surfactants, preservatives and pigments. They may also contain modified drying oils to inhibit water evaporation and premature breakdown of the emulsified film.

Any elastomeric or resinous film-forming polymer which can be emulsified in water in a form suitable for use in latex paints is suitable for the practice of this invention. Examples of such materials are butadiene-styrene copolymer, polystyrene, polyvinyl acetate, polyacrylics, vinyl chloride-vinylidine chloride copolymer, polyvinyl chloride, butadiene-acrylonitrile copolymer, chlorinated natural rubber and the like. The methods of preparation of these materials are well-known in the art. Butadiene-styrene copolymer, for example, is prepared by emulsion polymerization and the latex, as it is employed in this invention, will contain known dispersants and emulsifiers.

Another suitable rubbery film-forming polymer is a chlorinated degraded polyethylene of the type herein described. A highly crystalline polyethylene is cracked thermally to a lower molecular weight and chlorinated to produce this elastomer-resin.

Reinforcing resins which can be employed in the practice of our invention are polymers of ethylene or copolymers of ethylene with up to ten parts by weight per 100 parts of polymerizable material of acyclic monoolefins containing 3 to 8 carbon atoms. Examples of such comonomers are propylene, 1-butene, 2-butene, 1-pentene, 1-octene, and the like. The improved surface characteristics exhibited by the latex coating of our invention are obtained by employing ethylene polymers having relatively high crystallinity, the crystallinity at 25° C. being at least 80 percent, as determined by nuclear magnetic resonance. Ordinarily, the ethylene polymers employed are high molecular weight polymers (i.e., 20,000 to 100,000 and up) having a density of at least 0.94 gram per cubic centimeter at 25° C., and preferably a density of 0.955 to 0.99 and a crystallinity of about 90 to 94 percent. However, low molecular weight polymers, for example, as low as 500, can be advantageously employed if the above crystallinity requirements are met.

The preferred method of making such an ethylene polymer is by polymerization of ethylene with or without a comonomer of acyclic monoolefin having from 3 to 8 carbon atoms per molecule, in the presence of a catalyst comprising chromium oxide associated with at least one oxide selected from the group consisting of silica, alumina, zirconia and thoria, the chromium oxide-silica-alumina catalyst being preferred for commercial operation. A portion of the chromium is hexavalent and the total chromium content is preferably between 0.1 and 10 weight percent. The polymerization is ordinarily carried out at a temperature between 150 and 450° F. and a solvent is normally employed which is relatively inert, non-deleterious, and liquid under the reaction conditions. Suitable solvents are paraffins and/or cycloparaffins having 3 to 12 carbon atoms per molecule, such as propane, normal pentane, isopentane, isooctane, cyclohexane and methyl cyclohexane. The pressure of the reaction must be sufficient to maintain the solvent in a liquid phase and otherwise the pressure can vary over a wide range, for example from 100 to 700 pounds per square inch or higher.

Preparation of such olefin polymers is more fully described in a copending application of Hogan and Banks, Serial No. 573,877, filed March 26, 1956, now U.S. Patent 2,825,721.

While the above-described method is preferred for the manufacture of the ethylene polymer to be used in our invention, any process which will yield a product having the desired physical characteristics is satisfactory. For example, ethylene can be polymerized with or without co-monomers of acyclic olefins in the presence of a number of catalyst systems, preferably comprising an organometal derivative as one component. Such catalyst compositions can have two or more components, one component being an organometal compound, a metal hydride, or a group I, II or III metal and the other component being a compound of a group IV to VI metal. With certain of the above two component systems, an organic halide having 30 or less carbon atoms per molecule or a metal halide can be used advantageously as a third catalyst component. Specific examples of suitable catalyst systems are triethylaluminum and titanium tetrachloride, mixtures of ethylaluminum halides and titanium tetrachloride, titanium tetrachloride and sodium or magnesium, and titanium tetrachloride with lithium aluminum hydride and ethyl bromide.

To more fully describe the process of our invention, reference is now made to the accompanying drawing. Latices which are prepared in conventional emulsion polymerization systems normally contain about 20 to 50 weight percent solids and should be further concentrated before blending with the solution of ethylene polymer. In the embodiment depicted by the drawing, such is the case. Latex from emulsion polymerization is fed by line 10 to evaporator 11 wherein said latex is concentrated to a solids content of approximately 40 to 60 weight percent. This evaporator should be of a type adapted to concentrate viscous mixes and slurries with a relatively short residence time. A suitable apparatus is the "Turbofilm" evaporator made by the Rodney Hunt Machine Company, Orange, Massachusetts, described in this company's Catalogue No. 353. This is a vertical tubular device equipped with high speed agitating blades which distribute the liquid on the walls of the evaporator. In applications where concentration of the latex is not required, the evaporator can be replaced with any efficient heating means.

Polymer, prepared by the process described above, is dissolved in a solvent which can be any one of those suitable for the polymerization reaction, preferably isooctane, cyclohexane, or methylcyclohexane. The solution contains preferably between 2 and 10 weight percent ethylene polymer. This must be heated sufficiently so that the mixture of latex and polymer solution, upon combination, will have a temperature above the softening point of the ethylene polymer.

The polymer solution in line 12 is heated in heat exchanger 13 and passes through line 14 to line 16 wherein it is combined with the high solids latex and enters the colloid mill 17. The colloid mill 17 which effects a homogeneous mixture of latex annd polymer solution can be any suitable high shear mixer such as an "Entoleter," made by the Entoleter Division of Safety Car Heating and Lighting Company, Inc., New Haven, Connecticut, described in this company's Form No. 4399–4–49. If it is desired to add pigment to the latex, this can advantageously be done by combining the pigment with the polymer solution in line 14. The mixture of latex and polymer flows from homogenizer 17 through line 18 to flash tank 19 wherein hydrocarbon solvent is removed and the temperature is considerably reduced. An emulsion stabilizer is added to the blend in line 18.

Hydrocarbon solvent and water are flashed and leave overhead via conduit 20, passing through heat exchanger 21 wherein said vapors are condensed. The water and solvent are separated in phase separator 22 and the solvent is recovered for reuse in the process.

The cooled and concentrated latex-polymer blend passes from flash tank 19 through line 23 to column 24, wherein remaining solvent is stripped from the mixture, passing overhead through conduit 26 and condensing in heat exchanger 27. Condensed hydrocarbon solvent and water are separated in phase-separator 28 and the solvent is combined with recovered solvent of separator 22 in line 29 through which it is passed to purification steps or storage, pending reuse in the system. Water from separators 22 and 28 is discarded through line 30.

Latex product passes from stripper 24 through line 31 to product storage after being cooled in heat exchanger 32. The solids content of the latex product is in the range of about 40 to 60 weight percent, with from 5 to 100 parts by weight of ethylene polymer present per 100 parts of the elastomeric or resinous film-forming polymer base.

Operating conditions for the above described process will be described in connection with the specific embodiment in which polyethylene is blended with a butadiene-styrene copolymer latex. It should be understood that optimum operating conditions will depend upon the specific materials being blended but these can be readily determined by those skilled in the art from the requirements set forth in this specification. The polyethylene employed in this specific example is one prepared by the process as previously described employing a chromium oxide-silica-alumina catalyst and has a density of about 0.96 and a crystallinity of at least 25° C. above 90 percent. The polymer solution is about 5 weight percent polyethylene in a cyclohexane solvent. To concentrate the butadiene-styrene latex to about 50 weight percent solids, a temperature in the evaporator of about 200° F. is employed. When forming a blend of about 30 parts by weight of polyethylene per 100 parts of copolymer, heating the polymer solution to about 300° F. yields a combined mixture substantially above the softening point of the polyethylene, which is approximately 260° F. The pressure in the flash tank is normally at least one atmosphere and above. The temperature is preferably in the range of 150 to 225° F., a satisfactory operating temperature being about 175° F. Pressure in stripping column 24 is maintained at one atmosphere or below and the temperature is in the range of 100 to 212° F., a suitable operating temperature being about 150° F. Steam is used to add heat to flash tank 19 and stripper column 24 when needed to maintain the temperature in the desired range.

In carrying out the process of this invention, several rules must be observed to obtain a satisfactory product with a minimum of latex coagulation. The ethylene polymer should be in rather dilute solution, normally between 2 and 10 weight percent and preferably between 4 and 8 weight percent. The viscosity of this solution increases quite rapidly with concentration of polymer. The latex prior to blending should have a high solids concentration, preferably between 40 and 60 weight percent solids. Both the latex and the polymer solution must be at elevated temperatures so that when combined the temperature of the mixture is above the softening point of the polymer. For example, when polyethylene having a softening point of about 256 to 260° F. is used, the temperature of the mixture must be maintained above this range. Any suitable mixer can be used to blend the latex and polymer solution, but preferably a high shear colloid mill is used. It is important to effect a homogeneous blend of materials as rapidly as possible so that the mixture can be passed to the subsequent flashing step quickly, thereby preventing coagulation of the latex solids. The elapsed time from the initial heating to the final flash cooling step should not exceed five minutes and preferably is in the order of 30 seconds or less to two or three minutes. We have found that in order to effect satisfactory blending of the latex and ethylene polymer in this manner, the heating, blending and cooling steps must be carried out in rapid succession. If this is done, a stablized reinforced latex product can be made with a minimum of coagulation.

While this invention has been described in terms of specific and preferred embodiments thereof, various modifications will be apparent to those skilled in the art and it is intended that these should be included within the scope of our invention.

We claim:

1. A method of making an improved latex for paint and surface coatings which comprises forming a solution of from 2 to 10 weight percent of ethylene polymer in inert and non-deleterious hydrocarbon liquid solvent selected from the group consisting of paraffins, cycloparaffins and mixtures thereof, and having 3 to 12 carbon atoms per molecule, said ethylene polymer being selected from the group consisting of polyethylene and copolymers of ethylene with acyclic monoolefin having from 3 to 8 carbon atoms per molecule, said copolymers being polymerizates of monomer systems containing at least 90 parts by weight of ethylene per 100 parts of polymerizable material, said ethylene polymer being characterized by a density of 0.94 to 0.99 gram per cubic centimeter at 25° C. and a crystallinity of about 80 to 94 percent and 25° C.; forming a latex of a film-forming polymer selected from the group consisting of butadiene-styrene copolymer, polystyrene, polyvinylacetate, vinyl chloride-vinylidene chloride copolymer, polyvinyl chloride, butadiene-acrylonitrile copolymer, and chlorinated natural rubber; heating and concentrating said latex to about 40 to 60 weight percent solids; blending said solution and said latex in a solids weight ratio of 5 to 100 parts of ethylene polymer per 100 parts of film-forming polymer while maintaining the temperature of the combined materials above the softening point of the ethylene polymer, thus forming a homogeneous mixture; flashing said mixture to remove solvent therefrom; and cooling said mixture to a temperature in the range of 150 to 225° F., said flashing step being performed within about 5 minutes after said latex heating step, thereby preventing said latex from coagulating prematurely and producing a latex product containing from 40 to 60 weight percent solids.

2. A method of making an improved latex for paint and surface coatings which comprises forming a dilute solution of 2 to 10 weight percent ethylene polymer in an inert and non-deleterious liquid solvent selected from the group consisting of paraffins, cycloparaffins and mixtures thereof, and having 3 to 12 carbon atoms per molecule, said ethylene polymer being selected from the group consisting of polyethylene and copolymers of ethylene with acyclic monoolefin having from 3 to 8 carbon atoms per molecule, said copolymers being polymerizates of monomer systems containing at least 90 parts by weight of ethylene per 100 parts of polymerizable material, said ethylene polymer being characterized by a density of 0.94 to 0.99 grams per cubic centimeter at 25° C. and a crystallinity at 25° C. of about 80 to 94 percent, blending said solution with a high solids latex of a film-forming polymer selected from the group consisting of butadiene-styrene copolymer, polystyrene, polyvinylacetate, vinyl chloride-vinylidene chloride copolymer, butadiene-acrylonitrile copolymer, polyvinyl chloride, and chlorinated natural rubber, thereby forming a homogeneous mixture having a ratio of 5 to 100 parts by weight of said ethylene polymer per 100 parts by weight of said film-forming polymer, maintaining the temperature of said solution and said latex such that during said blending step the temperature of the mixture does not fall below the softening temperature of said ethylene polymer, and within about 30 seconds to 3 minutes after said blending step quickly cooling said mixture and flashing solvent therefrom before said latex can coagulate, thereby producing a latex product having from about 40 to 60 weight percent solids.

3. A method of making an improved latex for paint and surface coatings which comprises forming in an inert and non-deleterious hydrocarbon liquid solvent selected from the group consisting of paraffins, cycloparaffins and mixtures therefor, and having 3 to 12 carbon atoms per molecule a solution of from 2 to 10 weight percent polyethylene characterized by a density of 0.955 to 0.99 grams per cubic centimeter at 25° C., and a crystallinity at 25° C. of about 90 to 94 per cent; forming a latex having from 40 to 60 weight percent solids as film-forming polymer selected from the group consisting of butadiene-styrene copolymer, polystyrene, polyvinylacetate, vinyl chloride-vinylidene chloride copolymers, butadiene-acrylonitrile copolymer, polyvinyl chloride, and chlorinated natural rubber; heating said solution and said latex to temperatures such that said solution and latex can be mixed without the temperature of the mixture falling below 260° F.; blending said solution and said latex thereby forming a homogeneous mixture; passing said mixture through a flashing zone within 5 minutes after having heated said latex prior to said blending step; flashing said mixture to remove solvent therefrom at a temperature in the range of 150 to 225° F., thus cooling said mixture before said latex can coagulate; passing said latex-polyethylene mixture to a stripping zone operating at a temperature within the range of 100 to 212° F. thereby removing residual solvent therefrom; and recovering an improved latex product having from 40 to 60 weight percent solids which comprise from 5 to 100 parts by weight of said polyethylene per 100 parts of said film-forming polymer.

4. A method according to claim 3 wherein said film-forming polymer is a copolymer of butadiene and styrene.

References Cited in the file of this patent

UNITED STATES PATENTS

| | | |
|---|---|---|
| 2,386,674 | Flint et al. | Oct. 9, 1945 |
| 2,612,480 | May | Sept. 30, 1952 |
| 2,628,208 | Loukomsky | Feb. 10, 1953 |
| 2,691,647 | Field et al. | Oct. 12, 1954 |

FOREIGN PATENTS

| | | |
|---|---|---|
| 669,739 | Great Britain | Apr. 9, 1952 |